J. M. MANDZUK.
PLOW.
APPLICATION FILED JUNE 27, 1918.

1,280,793.

Patented Oct. 8, 1918.
2 SHEETS—SHEET 1.

INVENTOR
John Martinow Mandzuk.
BY
his ATTORNEY

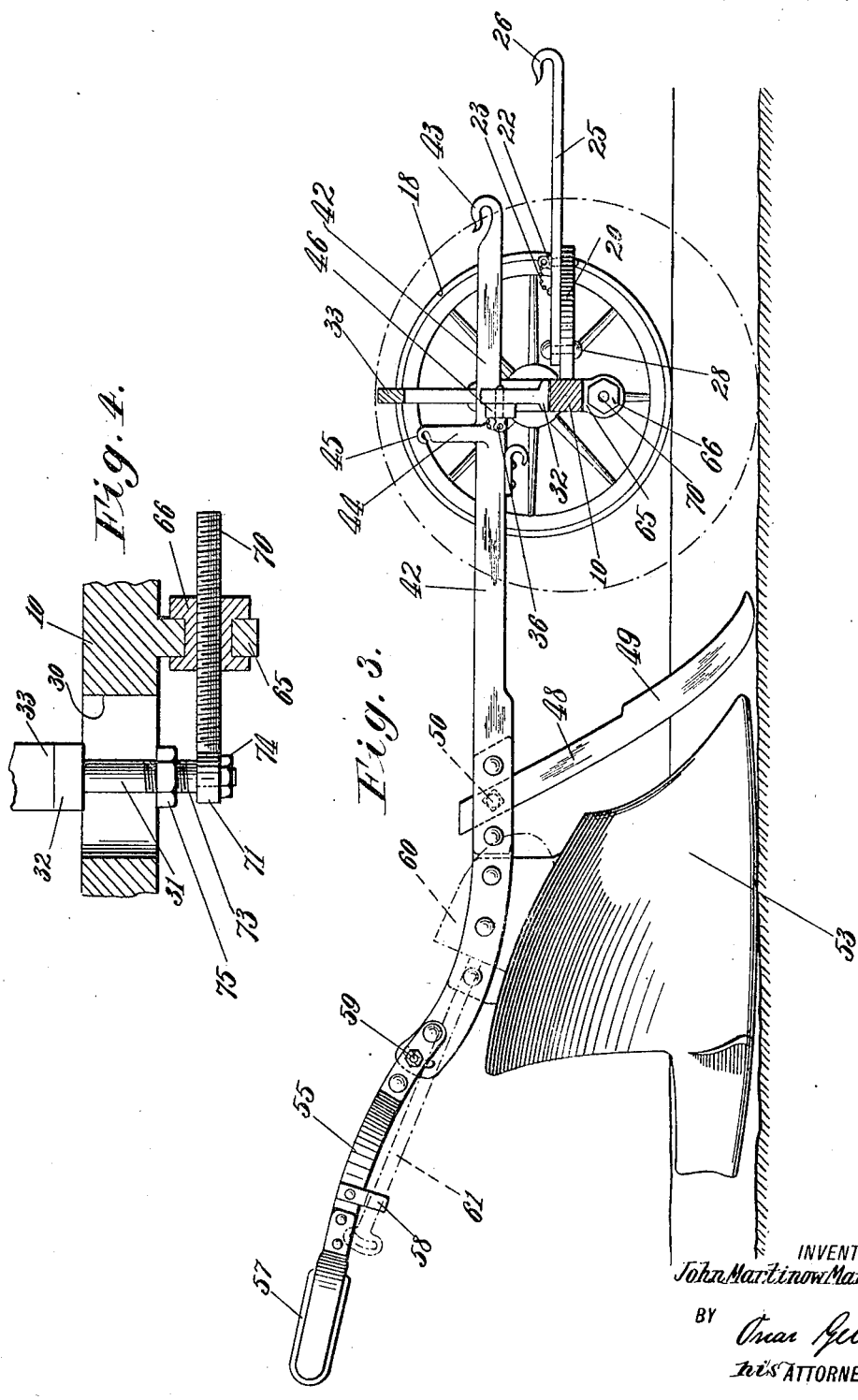

UNITED STATES PATENT OFFICE.

JOHN MARTINOW MANDZUK, OF ST. CATHARINES, ONTARIO, CANADA.

PLOW.

1,280,793.

Specification of Letters Patent.

Patented Oct. 8, 1918.

Application filed June 27, 1918. Serial No. 242,224.

*To all whom it may concern:*

Be it known that I, JOHN MARTINOW MANDZUK, a citizen of Russia, residing at St. Catharines, Province of Ontario, and Dominion of Canada, have invented certain new and useful Improvements in Plows, of which the following is a specification.

This invention relates to agricultural implements, particularly to those used in breaking the soil and known as plows.

The principal object of the invention is to provide a plow so arranged as to be adjustable with reference to the width of the furrow, and also with depth to which the plowshare is entered into the soil.

These and other like objects are attained by the novel construction and combination of parts hereinafter described and shown in the accompanying drawings, forming a material part of this disclosure, and in which:—

Fig. 3 is a longitudinal sectional view taken on line 3—3 of Fig. 1, and

Fig. 4 is an enlarged fragmentary sectional view showing one of the principal adjusting means.

Figure 2:
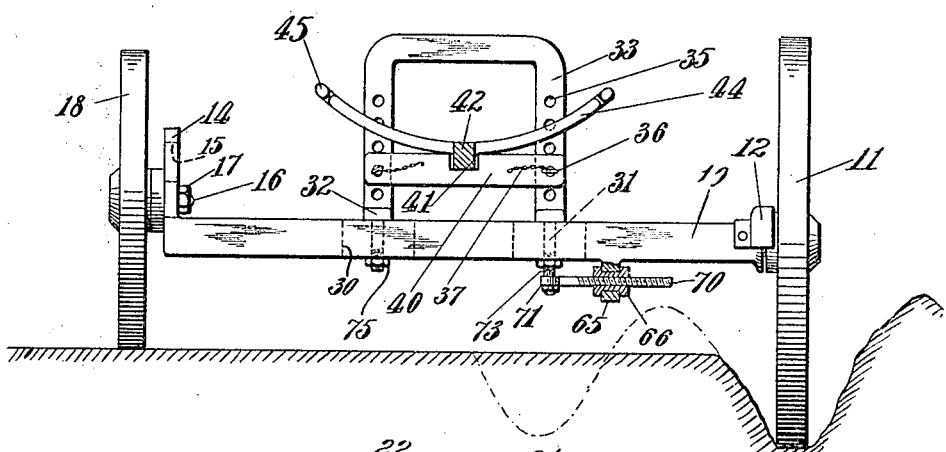
Fig. 2 is a vertical sectional view taken on line 2—2 of Fig. 1.

Like other plows of the same class, the same is comprised of a beam 10, acting as an axle, and having journaled thereto, the larger of the wheels, the wheel 11 being adapted to travel in the furrows adjacent to that about to be formed.

A guard 12 is set near the junction of the axle at the hub of the wheel, so as to prevent entrance of dirt, etc.

Upon the other end of the axle or beam 10, is an upturned element 14, containing a slot 15 through which passes a bolt 16, clamped in adjustment by the nut 17. The outer end of the bolt is formed in the manner of a pintle and another wheel 18 of lesser diameter than the corresponding wheel 11, the same being adapted to traverse over the surface of the soil prior to the entry of the plow therein.

Affixed to the axle, centrally thereof so as to extend horizontally at the front is a yoke 20, containing a plurality of perforations 21 receptive of a pin 22 which may be secured by a chain or cord 23 preventing its loss, the pin passing through an arm 25, formed with a hook 26 at its end, with which may be engaged the traces by which one or more draft animals are attached. The inner end of the arm 25 is pivoted on a pin 28, fixed in a bracket 29 extending outward from the axle, centrally between the arms of the yoke 20, the arrangement being such that the arm 25 may be extended at an angle relative to the axle in an obvious manner so as to permit the animals to travel upon the level surface of the ground, or slightly to one side thereof, as may be desired.

Formed through the axle 10 are slots 30 in which are slidably engaged stems 31 formed with a pair of feet 32, from which rise another looped yoke 33, having parallel sides containing perforations 35 receptive of pins 36, secured by chains 37, the pins adjustably engaging a cross bar 40, thereby permitting the cross-bar to be raised or lowered and held in any desired adjustment.

Carried in a transverse recess 41, formed in the cross bar is a beam 42, having a hook at its front extremity with which may be engaged the draft traces if it be so desired, rather than by the hook 36, and formed with the beam 42 are a pair of oppositely disposed curved arms 44 having hooks 45 at their extremity by which the reins or guiding lines for the animals may be attached.

Figure 1:
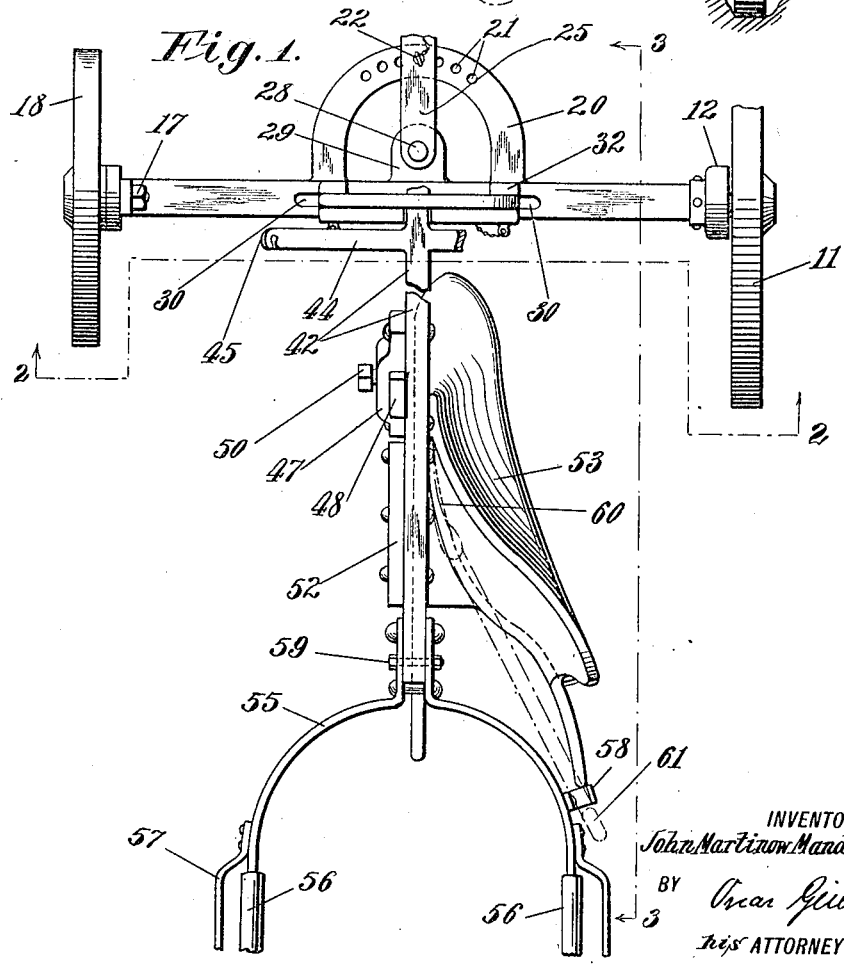
Figure 1 is a fragmentary top plan view, showing a plow made in accordance with the invention.

The plow beam 42 extends rearwardly and has engaged with it brackets 47 through which the shank 48 of the colter 49 extends, the same being clamped in position by the set screw 50. Also secured by the rigid connection 52 is a plow-share 53, the ends of the plow beam having secured upon opposite sides curved handle bars 55, provided with grips 56 and guards 57, the handle bars extending so that an operator may direct the plow in the ordinary manner. These handles can be raised or lowered and clamped in adjustment by the bolt 59 passing through a slot formed in the end of the beam 42. A clip 58 is secured to one of the bent handle bars which in conjunction with the upper portion of the plow-share is adapted to receive and maintain a spade 60, having a handle 61, the spade being held as indicated, by the broken lines, in Figs. 1 and 3. As shown in Fig. 2 the beam 42 rests in a central recess of the cross-bar 40 adjustable on the yoke 33, secured to the axle 10, thus the beam 42 will participate in the movement of the axle 10 and will be prevented from sliding off when the axle 10 is moved by the engagement of the curved arms 44 with the yoke 33.

In order to provide for lateral adjustment of the plow-share beam relative to the trackage of the wheels, a lug or projection 65, secured to the axle upon its lower side has engaged in it a nut 66 so as to be freely rotatable therein, the nut containing a screw thread engageable with the bolt 70, having an eye 71, and which is received on the lower extending portion 73 of one of the stems 31, formed with the yoke 33, the eye being secured in position by the clamp nut 74, thereby permitting the yoke 33 to be moved lengthwise of the axle upon operating the nut 66.

From the foregoing, it will be seen that the plow share and colter may be moved relatively to the center of furrow in which the main support wheel 11 moves thereby enabling a wider "land" to be turned by the plow-share while, due to the vertical adjustment of the cross bar 40, the plow-share may be operated at different depths relative to the level surface of the soil.

Having thus described my invention what I claim as new and desire to secure by Letters Patent, is.

In a plow, the combination with an axle having wheels journaled at the ends thereof, said axle containing vertical slots, of a yoke having stems enterable in said slots, a lug formed with said axle extending therebelow, a screw-threaded nut engaged in said lug, a bolt in said nut, connections between said bolt and one of said stems, whereby said yoke may be moved longitudinally of said axle and a plow-beam carried by said yoke.

In testimony whereof I have affixed my signature.

JOHN MARTINOW MANDZUK.

Copies of this patent may be obtained for five cents each, by addressing the "Commissioner of Patents, Washington, D. C."